US006286658B1

(12) United States Patent
Hufford

(10) Patent No.: US 6,286,658 B1
(45) Date of Patent: Sep. 11, 2001

(54) VIBRATORY CONVEYOR

(75) Inventor: David W. Hufford, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 09/373,137

(22) Filed: Aug. 12, 1999

(51) Int. Cl.[7] ................................................. B65G 27/16
(52) U.S. Cl. ......................................... 198/766; 198/760
(58) Field of Search .................................. 198/758, 759, 198/760, 763, 766, 771

(56) References Cited

U.S. PATENT DOCUMENTS

| | | |
|---|---|---|
| 979,200 | 12/1910 | Prosser . |
| 1,484,248 | 2/1924 | Austin . |
| 2,365,978 * | 12/1944 | Strain .................................. 198/766 |
| 2,876,891 | 3/1959 | Long et al. . |
| 2,951,581 | 9/1960 | Long et al. . |
| 3,240,322 * | 3/1966 | Allen et al. ........................... 198/766 |
| 3,380,570 | 4/1968 | Jordan, III . |
| 3,641,831 | 2/1972 | Palmaer .............................. 74/250 C |
| 3,826,150 | 7/1974 | Palmaer .................................. 74/250 |
| 4,088,223 * | 5/1978 | Bertrand .......................... 198/766 X |
| 4,260,051 * | 4/1981 | Burghart ............................... 198/760 |
| 4,313,535 | 2/1982 | Carmichael .......................... 198/766 |
| 4,723,660 | 2/1988 | Sjoberg .................................. 209/622 |
| 4,742,907 | 5/1988 | Palmaer ................................. 198/831 |
| 4,901,861 | 2/1990 | Cicchelli .............................. 209/539 |
| 4,901,866 | 2/1990 | Barella .................................. 211/1.3 |
| 5,069,330 | 12/1991 | Palmaer et al. ....................... 198/778 |
| 5,090,576 | 2/1992 | Menten ................................. 209/587 |
| 5,167,771 | 12/1992 | Sayers et al. ...................... 162/358.4 |
| 5,181,601 | 1/1993 | Palmaer et al. ....................... 198/831 |
| 5,224,583 | 7/1993 | Palmaer et al. ....................... 198/779 |
| 5,253,749 | 10/1993 | Ensch ................................... 198/850 |
| 5,339,965 | 8/1994 | Klukis et al. ......................... 209/639 |
| 5,431,289 | 7/1995 | Hoffman .............................. 209/638 |
| 5,482,166 | 1/1996 | Brown .................................. 209/580 |
| 5,543,015 | 8/1996 | Jermo ............................... 162/358.4 |

OTHER PUBLICATIONS

Excerpts from KVP Systems, Inc., Rancho Cordova, CA 95670, brochure, "Innovators of Engineered Plastic Conveyor and Material Handling Components".
Excerpts from Intralox brochure, Series 600, 2–24 Product Line, Intralox System, Series 400, 500, 600, Series CC40 belt, all plastic modular conveyor belts.
Loctronic Graders Limited, Danbury, Chelmsford, Essex, England, brochure "The Loctronic Autoselector".
Series 40, "Belt Accessories—Special Belts" CC40.

* cited by examiner

*Primary Examiner*—James R. Bidwell
(74) *Attorney, Agent, or Firm*—Wells, St. John, Roberts, Gregory & Matkin P.S.

(57) ABSTRACT

A vibratory conveyor employing an amplitude compensator to substantially impede the conveyor bed from moving beyond a given range of vibration amplitude is described. The amplitude compensator coacts with the conveyor bed as the vibrational amplitude of the bed increases in response to an increase in the mass of conveyed product, or to an increase in the vibrational force produced by the vibratory drive to impede or substantially eliminate premature wear or mechanical failure of leaf springs which support the bed.

22 Claims, 4 Drawing Sheets

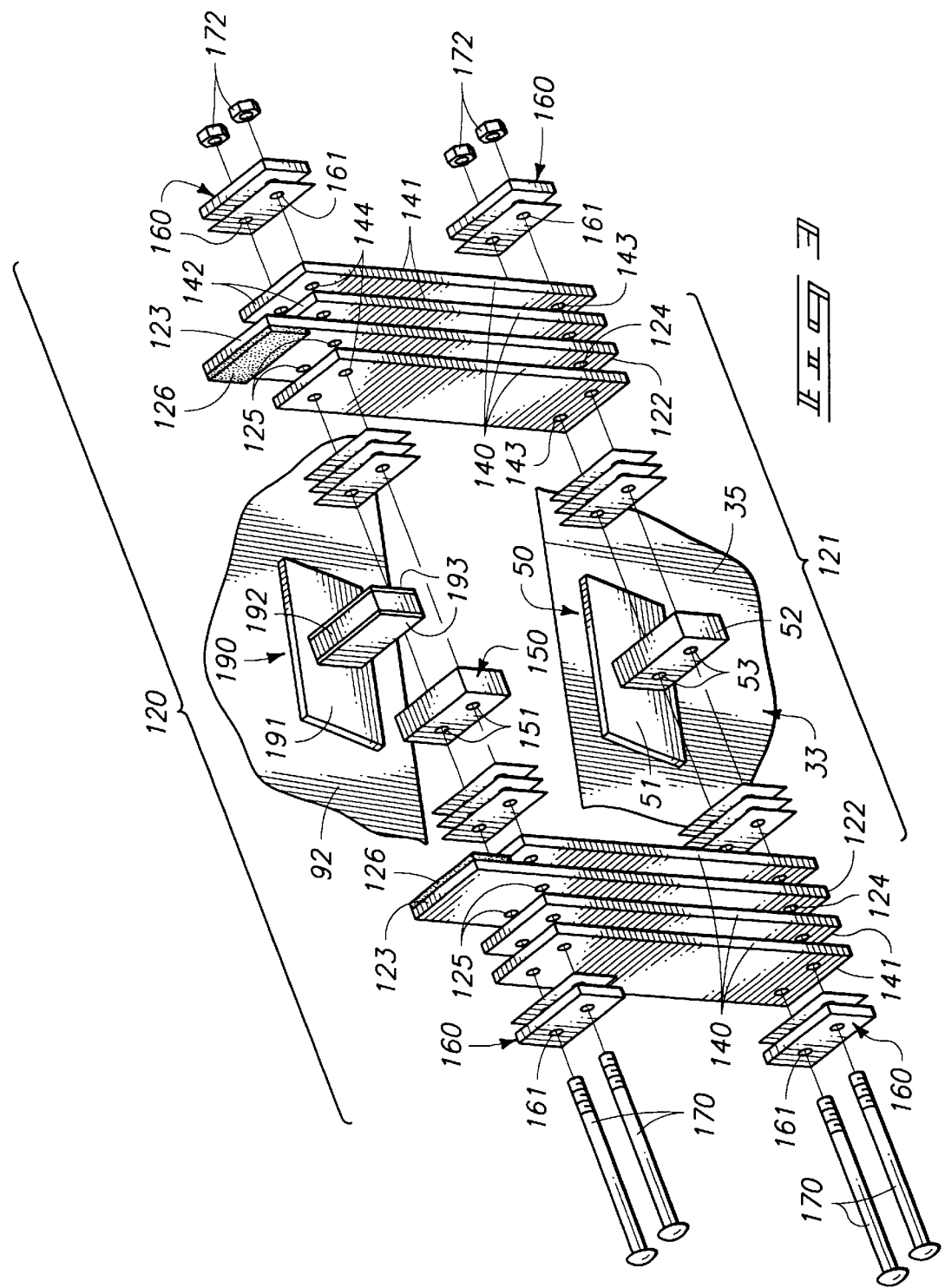

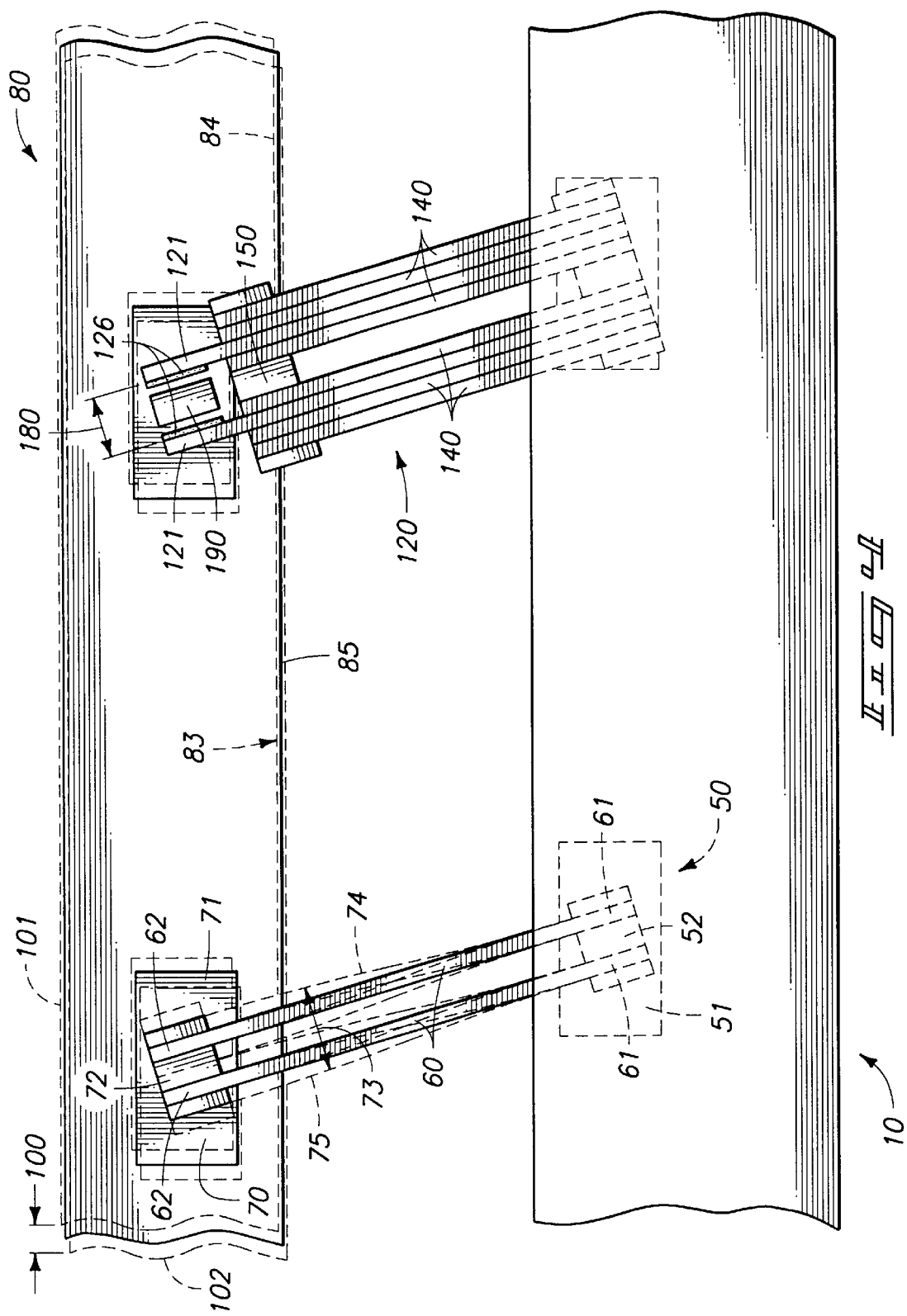

VIBRATORY CONVEYOR

TECHNICAL FIELD

The present invention relates to a vibratory conveyor and more specifically to an improved spring for use with same.

BACKGROUND OF THE INVENTION

Excited frame vibratory conveying devices are known in the art. U.S. Pat. No. 4,313,535, incorporated by reference herein, teaches a typical excited frame conveying apparatus. An apparatus such as this generally includes a vibratory drive mounted on an elongated frame and which rests on a floor or other supporting structure. Extending upwardly from the frame, and inclined in the direction of the infeed end of the conveyor are a plurality of leaf springs. An elongated conveyor bed is mounted on the distal ends of the leaf springs and is supported by them such that the bed is generally parallel to the frame and oriented in a substantially horizontal position.

Due to the resiliency of the leaf springs, the bed is capable of moving relative to the frame in response to a force applied to the bed by the vibratory drive. During operation of the conveyor, the vibratory drive produces an oscillating vibratory force. This vibratory force is usually generated by counter-rotating eccentric weights which are subcomponents of the vibratory drive. Because the vibratory drive is mounted on the frame, it imparts vibratory motion to the frame which is transferred through the leaf springs to the bed. Thus, the bed vibrates at substantially the same frequency as the drive and frame.

In operation, if the bed is displaced from its "at rest" position and then allowed to oscillate freely, it will oscillate at its natural or "harmonic" frequency. This natural frequency of the bed is dependent on both the combined spring constant of the springs supporting the bed as well as the mass of the bed. Generally, at frequencies near the natural frequency of the bed, the vibration of the vibratory drive is amplified significantly by the springs, resulting in substantially more movement of the bed than the frame. The maximum vibrational amplitude of the bed is attained when the frequency of the vibratory drive is the same as the natural frequency of the bed and springs.

In view of the design of the leaf springs, the bed supported by same is restricted to a given range of motion. In particular, the bed and frame remain substantially parallel to each other at all times. As the bed vibrates freely, it moves in a first direction that is generally upward and toward the outfeed end of the conveyor and then in a second, and opposite direction that is generally downward and toward the infeed end of the conveyor. This vibratory motion of the bed tends to "bounce" the product along the bed from the infeed end to the outfeed end.

As compared to other types of vibratory conveyors, less vibration is transferred to the floor or other supporting structure by an excited frame design because of its relatively light weight and small vibration amplitude of the frame compared to the vibration amplitude of the bed. The low level of vibration transferred to the surrounding structure is a chief advantage of the excited frame vibratory conveyor.

While vibratory conveyors have operated with varying degrees of success in handling various products, there have been shortcomings which have detracted from their usefulness. For example, if the vibrational amplitude of the bed is allowed to become too great, the leaf springs supporting same become repeatedly over-stressed. This results in premature wear and sometimes failure of the springs. This problem stems, in part, from the nature of the prior art excited frame design, inasmuch as the bed is allowed to vibrate freely in response to changing conditions which affect the vibrational amplitude of the bed.

In addition to the foregoing, commercial operators of vibratory conveyors want the conveyors to be as versatile as possible. For example, the operators want the conveyor to be able to handle a wide array of products at different conveying speeds. Thus, an operator of a vibratory conveyor often wants to control both the frequency of vibration and the amplitude of vibration of the bed in order to control the conveying speed of the product. Also, the operator may wish to adjust both the frequency and amplitude to avoid damage to more fragile or delicate products.

Generally then, it is desirable for the frequency of vibration to be directly correlated to the amplitude of vibration since both contribute to the conveying speed. In other words, it is usually desirable for the vibration amplitude to increase as the vibration frequency increases and vice versa, since both the amplitude and frequency are generally directly related to conveying speed. If the vibratory drive is operated at frequencies that are below the natural frequency of the bed, an increase in the frequency of the vibratory drive will bring the frequency of the vibratory drive closer to the natural frequency of the bed, thus increasing the vibrational amplitude of the bed. Therefore, the vibratory drive is usually operated at a frequency that is less than the natural frequency of the system to ensure a direct correlation of the frequency and amplitude of the bed.

As a general matter the natural frequency of the bed is inversely proportional to the mass of the bed. In other words, the heavier the bed, the lower its natural frequency. As a practical matter, the mass of the bed also includes the product being supported by the bed. Thus, as the mass of the product on the bed increases, the natural frequency of the bed will decrease. As mentioned above, the vibratory drive is generally operated at a frequency that is lower than the natural frequency of the bed. Consequently, as the mass of the product on the bed increases and the frequency of the vibratory drive remains constant, the natural frequency of the bed will decrease and approach the frequency of the vibratory drive, which in turn, results in an increase in the vibrational amplitude of the bed. As will be readily recognized the mass of beds in most commercial environments will be changing dynamically over time in view of day to day manufacturing contingencies.

As should be understood, the degree of amplification of the vibration produced by the vibratory drive increases exponentially as the frequency of the vibration approaches the natural frequency of the bed. Generally, the degree of amplification is limited only by any frictional damping forces present in the system, which in a conveyor of this type is generally negligible. Thus, as the frequency of the drive and the natural frequency of the bed approach one another, the amplitude of the bed increases to a degree which encourages the premature failure of the springs.

As noted above, in a commercial environment, the mass of the product on the conveyor bed can change dynamically over time. For example, if a downstream stoppage occurs, product may back up along the production line and become more densely packed on the conveyor bed. Also, certain types of product may contain substances which adhere to the conveyor bed, causing a buildup of the same substance on the bed, resulting in an increased mass of the bed. Still further, a product may be processed which has a higher density than that for which the conveyor was originally designed.

In addition to the foregoing, while the vibrational amplitude of the bed will generally increase in response to an increase in the mass of the bed, the amplitude will also generally increase in response to an increase in the frequency of the vibratory drive. For example, the operator of the conveyor may increase the vibrational frequency of the vibratory drive in an effort to increase the conveyed speed of the product. Varying the frequency of the vibratory drive is accomplished by varying the speed of the motor which drives the eccentric weights, such as by using a variable speed drive unit in conjunction with an a/c motor. An increase in the speed of the motor will increase the frequency of the vibratory drive, bring the bed closer to its natural frequency, resulting in an increase in the vibrational amplitude of the bed.

In both cases noted above, whether by an increase in the vibrational frequency of the drive or, by an increase in the mass of the bed, the vibrational amplitude of the bed may increase to unsatisfactorily high levels, thereby encouraging the premature failure of the associated springs and possibly damage to other parts of the conveyor or adjacent processing equipment. Thus, an excited frame conveyor must normally be monitored closely by an operator so that the frequency of the drive remains sufficiently below the natural frequency of the bed in order to prevent premature failure of the springs. This can sometimes be difficult if not impossible to accomplish given the changing nature of the bed mass in response to changing product manufacturing and processing conditions.

To address these perceived disadvantages, users of such devices have considered lowering the drive frequency to compensate for increased bed mass. However this has not been satisfactory because this will generally result in an undesirably slow conveying speed. Yet further, the installation of enhanced springs will not solve the problem, but will simply increase the natural frequency of the bed, which inturn, will require a correspondingly higher operating frequency of the vibratory drive in order for the excited frame conveyor to function properly.

Therefore it has long been known that it would be desirable to provide a vibratory conveyor which achieves the benefits to be derived from similar prior art devices and assemblies, but which avoids the shortcomings and detriments individually associated therewith.

BRIEF DESCRIPTION OF THE DRAWINGS

Preferred embodiments of the invention are described below with reference to the following accompanying drawings.

FIG. 3 is a fragmentary, perspective view of an amplitude compensator which is utilized with the vibratory conveyor shown in FIGS. 1 and 2.

FIG. 4 is an enlarged, fragmentary side elevation view of the vibratory conveyor shown in FIGS. 1 and 2 and showing different positions of the conveyor bed as it moves in response to vibratory motion imparted to it by the vibratory drive.

DETAILED DESCRIPTION OF THE PREFERRED EMBODIMENTS

Figure 1:
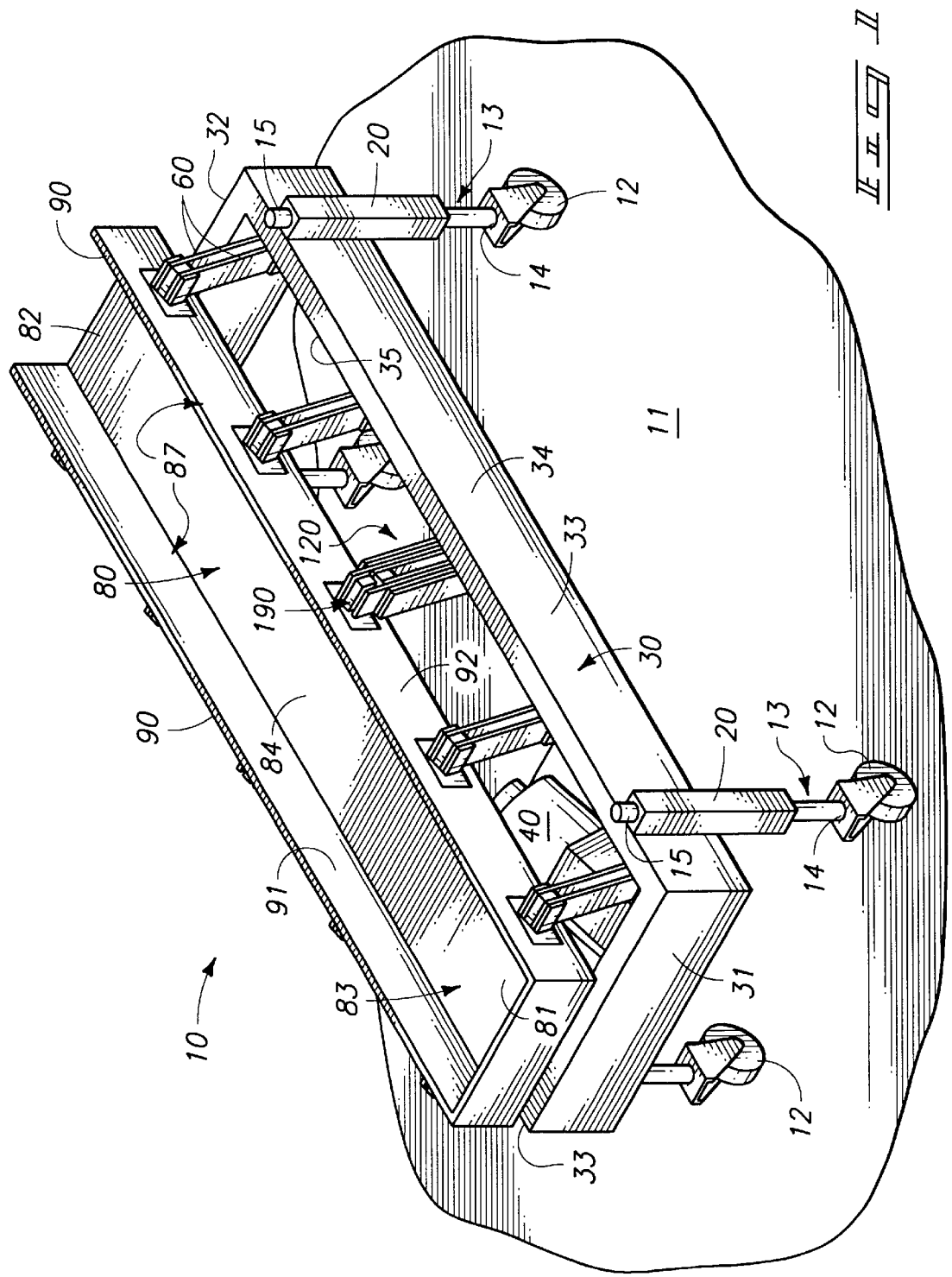
FIG. 1 is a perspective view of the vibratory conveyor apparatus of the present invention.

This disclosure of the invention is submitted in furtherance of the constitutional purposes of the U.S. Patent Laws "to promote the progress of science and useful arts" (Article 1, Section 8).

In accordance with one aspect of the present invention, a vibratory conveyor apparatus comprises a frame; a drive assembly borne by the frame for imparting vibratory motion to the frame; a first resilient member mounted on the frame; a bed mounted on the first resilient member, the first resilient member transmitting the vibratory motion from the frame to the bed; and an amplitude compensator mounted on the vibratory conveyor to substantially impede the bed from traveling outside a given range of motion as the bed moves in response to the vibratory motion.

Another aspect of the present invention relates to a vibratory conveyor apparatus for moving particulate matter comprising a frame; a drive assembly borne by the frame and operable to impart vibratory motion to the frame; a plurality of resilient members borne by the frame, each resilient member having a predetermined range of motion; a bed mounted on the resilient members, and wherein the vibratory motion imparted to the frame is transmitted to the bed by the resilient members to cause the bed to reciprocate along a given path of travel relative to the frame; and wherein the path of travel is defined between a forwardmost position, and a rearwardmost position, and wherein the reciprocating movement of the bed along the path of travel has a given amplitude; and an amplitude compensator mounted on the frame which coacts with the bed and substantially impedes the bed from traveling beyond the given path of travel.

Yet another aspect of the present invention relates to a vibratory conveyor apparatus for moving particulate matter comprising a frame; a drive assembly borne by the frame and operable to impart vibratory motion to the frame, the vibratory motion having a predetermined frequency; a plurality of first leaf springs borne by the frame, and wherein the first leaf springs are substantially parallel, one to another, and oriented at an oblique angle relative to the bed, and wherein each of the first leaf springs has a predetermined range of motion; a bed mounted on and supported by the first leaf springs, and wherein the vibratory motion imparted to the frame is transmitted to the bed by each of the first leaf springs to cause the bed to reciprocate relative to the frame, and wherein the bed has a path of travel which comprises a reciprocating displacement which is defined between a first position and a second position, and wherein the movement of the bed has an amplitude which varies in proportion to the frequency of the vibratory motion and to a mass density of the particulate matter supported by the bed; and an amplitude compensator comprising a second leaf spring mounted on the frame and which acts on the bed to limit the amplitude of movement of the bed along the path of travel and substantially impede the first leaf springs from traveling outside the predetermined range of motion.

The apparatus of the subject invention is best understood by a study of FIGS. 1 and 4 and is generally indicated by the numeral 10. As shown in FIG. 1, the apparatus 10 rests on the surface of the earth 11 and is supported in rolling engagement therewith by a plurality of castors 12 of conventional design. The castors are affixed by conventional fastening means to a leg generally designated by the numeral 13. Each leg has a proximal end 14 which is affixed to the respective castors 12 and an opposite distal end 15 which is remote thereto. The distal end of each of the legs 15 is received in an adjustment fixture 20. The adjustment fixture, in combination with the distal end of each of the legs, allows the apparatus 10 to be positioned in various locations above the surface of the earth 11. The vibratory conveyor apparatus 10 includes a frame generally designated by the numeral 30 and which is mounted in substantially parallel spaced relationship to the surface of the earth 11. The frame 30 is generally rectangular and has a first end 31 and an opposite second end 32. Still further, the frame is defined by substantially elongated siderails designated by the numeral 33. Each of the siderails have an outside facing surface 34, and an opposite, inside facing surface 35.

Figure 2:
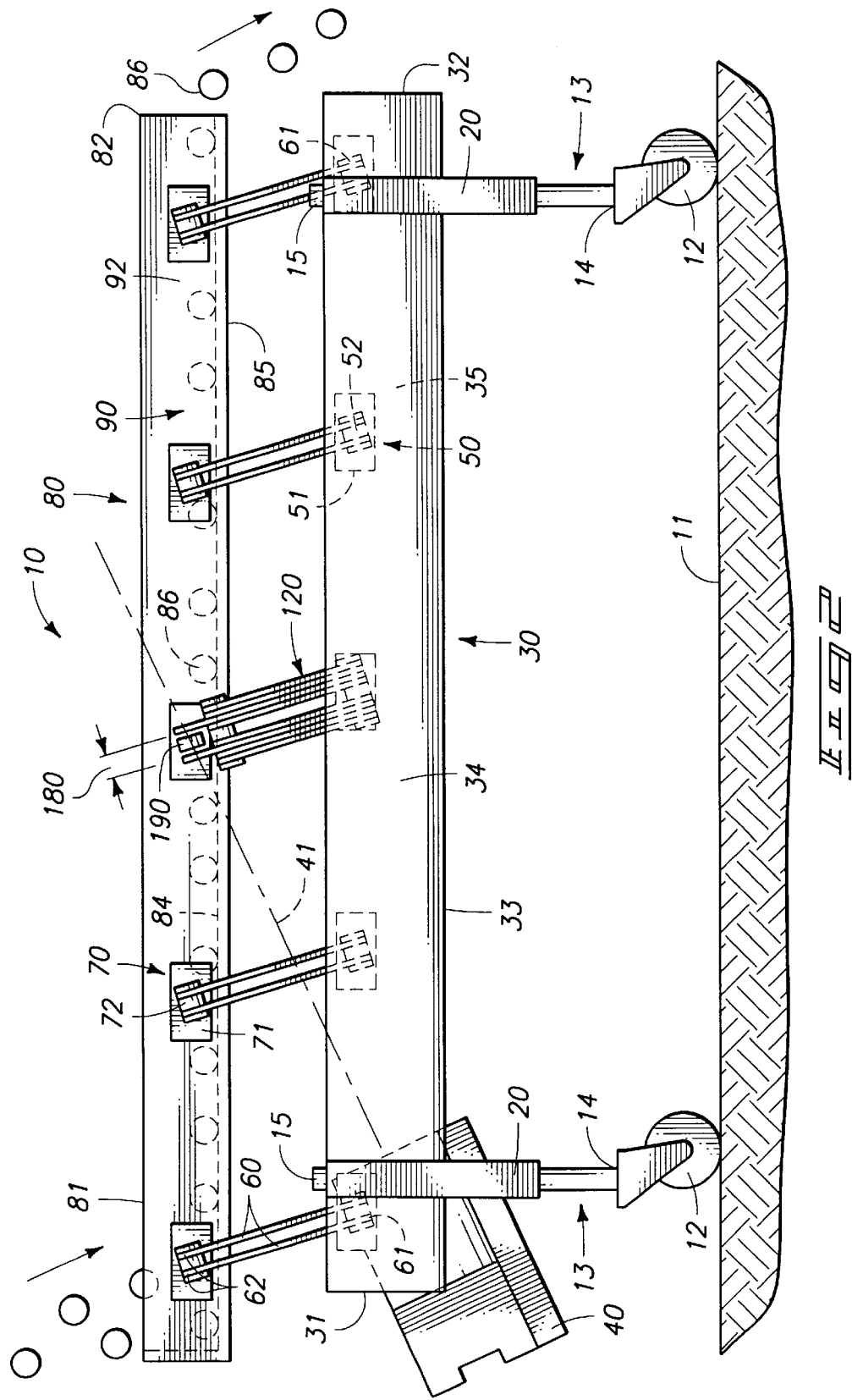
FIG. 2 is a side elevation view of the vibratory conveyor shown in FIG. 1 with some underlying surfaces shown in phantom line.

As best seen in FIGS. 1 and 2, a vibratory drive generally designated by the numeral 40 is borne by the frame 30 and is operable to impart vibratory motion to the frame. The vibratory motion is directed along a line of force which is generally designated by the numeral 41 in FIG. 2. The vibratory drive used with the present device has been described in U.S. Pat. No. 4,313,535 which is incorporated by reference herein. The vibratory drive, as used in the present invention, includes a variable speed motor which allows the frequency of the vibratory drive to be changed. Variable speed motors are well-known to those in the art.

As best seen by reference to the exploded view shown in FIG. 3, a plurality of lower mounting fixtures generally designated by the numeral 50 are affixed by welding or suitable fasteners to the inside facing surface 35 of each of the rails 33. These lower mounting fixtures are mounted at predetermined substantially equally spaced locations along each of the rails. Each of the lower mounting fixtures 50 have a baseplate 51 which is affixed to the inside facing surface 35. This can be accomplished by welding or other suitable fasteners as indicated above. Still further, a post 52 is mounted to or otherwise made integral with baseplate 51 and extends substantially normally outwardly therefrom. The post 52 has a pair of apertures 53 formed therein.

As seen in FIGS. 1, 2 and 4, the vibratory conveyor apparatus 10 includes a first resilient member generally indicated by the numeral 60 and which usually comprises a plurality of pairs of first leaf springs designated by the numeral 60. These leaf springs are well understood in the art and are made from various materials appropriate for the conveyor bed which is supported by same. The conveyor bed will be discussed in further detail hereinafter. As seen in FIG. 4, each pair of first leaf springs 60 have respective first ends 61 and opposite distal ends 62. As best appreciated by a study of FIGS. 2 and 4 the proximal or first ends 61 are affixed by a pair of fasteners, not shown, which are received through the individual springs 60 and which further pass through the lower mounting fixtures 50 by way of the apertures 53. As seen by reference also to FIG. 2 the vibratory conveyor apparatus 10 also includes upper mounting fixtures 70 which have a design which is substantially similar to the lower mounting fixtures 50. The upper mounting fixtures include a baseplate 71, and a post 72 which is affixed thereto. In similar fashion as that shown with respect to the lower mounting fixtures 50, apertures, not shown, are formed in the post 72 and suitable fasteners are received through the distal ends 62 of each of the leaf springs and through the apertures formed in the post 72 thereby securing the distal ends of each of the leaf springs 62 to the upper mounting fixture 70. As seen most clearly by reference to FIG. 4, the plurality of resilient members or first leaf springs 60 which are borne by the frame each have a predetermined range of motion which is designated by the line labeled 73. This range of motion is defined between a forwardmost position 74 and a rearwardmost position 75. As should be understood, vibratory motion imparted to the frame 30 is transmitted to the resilient members 60 borne by the frame to cause the resilient members 60 to move along this given range of motion 73. As discussed earlier, encouraging the first leaf springs 60 to exceed this given range of motion 73 has the propensity for facilitating the premature failure of the respective first leaf springs 60.

As best seen by reference to FIGS. 1, 2 and 4, the vibratory conveyor apparatus of the subject invention 10 includes a conveyor bed which is generally indicated by the numeral 80 and which is mounted on the first resilient members 60. As earlier noted, the first resilient members transmit vibratory motion from the frame 30 to the conveyor bed 80. The conveyor bed 80 is of substantially conventional design having a first or intake end 81, and an opposite, second, or exhaust end 82. The conveyor bed defines a supporting surface 83 having a uppermost or top surface 84 and a lowermost or bottom surface 85. As best seen in FIG. 2, the top or uppermost surface 84 supports product 86 which travels therealong to the exhaust end 82 for further processing by other equipment, not shown. While the product is shown generally as having a round or spherical configuration, it will be recognized that products of varying shapes may be utilized with a conveyor of this design. The conveyor bed 80 further includes a pair of substantially parallel siderails 90 which are mounted on the product supporting surface 83 and define a channel 87 which limits the lateral motion of the product 86. Each of the siderails 90 extend substantially normally upwardly from the surface 83. Each of the siderails 90 have an inside facing surface 91, and an outside facing surface 92. As best seen by reference to FIG. 2, the upper mounting fixtures 70 are affixed by a suitable fastening technique such as welding, fasteners or the like at predetermined given substantially equally spaced locations along the outside facing surface 92 of the respective siderails 90. As best seen by reference to FIG. 4, the vibratory motion imparted to the conveyor bed 80 comprises a reciprocating movement along a given range of motion 100 between a first or forwardmost position 101, and a second or rearwardmost position 102. This range of motion or path of travel has a given amplitude based upon mass of the conveyor bed 80 and the product which is carried or supported by same. This matter was discussed earlier in this application. As noted above, exceeding the given amplitude of the conveyor bed can cause deleterious effects to the underlying first leaf springs 60 which are supporting the conveyor bed 80.

An amplitude compensator is generally indicated by the numeral 120 in FIGS. 1–4, respectively. As best understood by a study of FIGS. 2 and 3, respectively, the amplitude compensator comprises a pair of second leaf springs or resilient members 121 which are mounted on the frame 30 and which coact with the conveyor bed 80 to limit the amplitude of the movement of the conveyor bed 80 along the range of motion or path of travel 100, and further to substantially impede the first leaf springs 60 from traveling outside the predetermined range of motion 73. As such, the amplitude compensator prevents the premature deleterious degradation of the plurality of first leaf springs 60 as might be caused from time-to-time in those circumstances whereby the vibratory conveyor apparatus 10 is being operated in such a fashion as to encourage the amplitude of the conveyor bed 80 to move beyond what is reasonably prudent, or advisable. As noted earlier, the conveyor bed 80 moves along a path of travel 100 comprising a reciprocating displacement which is defined between a first or forwardmost position 101 and a second or rearwardmost position 102. This reciprocating displacement or other movement of the conveyor bed 80 has an amplitude which varies in proportion to the frequency of the vibratory motion and to a mass density of the particulate matter or product 86 which is being supported by the conveyor bed 80. As such, the amplitude compensator substantially impedes the first leaf springs from traveling outside the predetermined range of motion 73.

As noted above, the amplitude compensator 120 includes a second pair of resilient members generally designated by the numeral 121. These second resilient members or second leaf springs 121 have a given length dimension and further have opposite first and second ends 122 and 123, respectively. As seen in FIG. 3, each of the second resilient members have a pair of apertures 124 formed in the first end thereof and a second pair of apertures 125 which are formed therein, and which are spaced a given distance from the second end 123 thereof. A cushion pad 126 is mounted on the second end 123 of each of the second resilient members 124.

As best understood by a study of FIG. 3, a plurality of third leaf springs 140 are mounted in juxtaposed, predetermined, substantially parallel relation relative to the second pair of leaf springs 121. The third leaf springs 140 have an overall length dimension which is less than the length dimension of the second resilient members. The third leaf springs 140 each have a first end 141 and an opposite second end 142. A pair of apertures 143 and 144, respectively, are formed in the first and second ends, respectively. These apertures are oriented such that they are substantially coaxially aligned with the apertures 124, and 125 which are formed in the second pair of leaf springs 121. This is illustrated most clearly by reference to FIG. 3.

A spacing block generally designated by the numeral 150 is mounted between each of the second leaf springs thereby locating the respective second leaf springs in predetermined spaced relationship one to the other. The spacing block 150 has a pair of apertures 151 formed therein which are coaxially aligned with the apertures 125 and 142 formed in the respective second and third leaf springs 121 and 140, respectively. The spacing block has a given thickness dimension. Smaller mounting plates 160 having apertures 161 formed therein are suitably positioned outwardly of the second leaf springs 121 and threaded fasteners 170 are provided which are received in the coaxially aligned apertures of the respective subassemblies. Suitable nuts 171 threadably engage the fasteners 170 thereby providing the sandwich like construction shown in FIG. 4. As will be recognized by a study of FIG. 4, the amplitude compensator 120 defines a given space 180 between the second ends 123 of the respective second resilient members 121.

As best understood by reference to FIG. 3, the amplitude compensator 120 further comprises a contact member generally designated by the numeral 190 which is mounted on the outside surface 92 of the conveyor bed 80 and which is operable to impinge against the second end 123 of the respective second leaf springs 121 when the conveyor bed moves along the range of motion or path of travel 100 between the first or forwardmost position 101 and the second and rearwardmost position 102. As will be recognized, if the conveyor bed 80 moves beyond the range of motion or path of travel 100 the contact member 190 is oriented such that it impinges alternatively against each of the pair of second leaf springs thereby substantially impeding the motion of the conveyor bed 80 beyond the predetermined range of motion.

The contact member 190 has a baseplate 191 which is affixed by welding or the like on the outside facing surface 92 of the respective siderails 90. A post 192 is welded or otherwise made integral with the baseplate and is oriented in the space 180 defined between the second ends 123 of the pair of second resilient members or leaf springs 121. A cushioning surface 193 is mounted on the post and is operable to dampen the noise caused by any impingement of the second leaf springs 121 by coacting with the pad 126 mounted on the second resilient members 121 against the post 192. It should be recognized that the post 192 and the cushioning surface 193 have a given thickness dimension. As shown it should be understood that the thickness dimension of the spacing block 150 is greater than the combined thickness dimension of post 192 and cushioning surface 193. It should also be understood that the movement of the conveyor bed 80 beyond a given amplitude causes the amplitude compensator 120 to transmit a given force between the conveyor bed 80 and the frame 30. Still further this given force is substantially parallel to the movement of the conveyor bed 80 and the given force is substantially proportional to the amplitude of movement of the conveyor bed along the path of travel 100.

OPERATION

The operation of the described embodiment of the present invention is believed to be readily apparent and is briefly summarized at this point.

As earlier discussed, the vibratory conveyor apparatus 10 of the subject invention comprises a frame 30; a drive assembly 40 borne by the frame for imparting vibratory motion to the frame 30; a first resilient member 60 mounted on the frame 30; a bed 80 mounted on the first resilient member 60, the first resilient member transmitting the vibratory motion from the frame 30 to the bed 80; and an amplitude compensator 120 mounted on the frame to substantially impede the bed from traveling outside a given range of motion 100 as the bed 80 moves in response to the vibratory motion. As earlier discussed, the vibratory conveyor 10 and in particular the amplitude compensator 120 comprises a second resilient member 121 which impedes the bed 80 from moving outside the given range of motion 100 by transmitting a given force between the bed 80 and the frame 30. This given force is produced when the bed 80 deforms the second resilient member 121. This deformation occurs as the contact member 190 moves against same. As noted above, the vibratory motion of the bed 30 comprises a reciprocating movement along a given path of travel or range of motion 100 which is defined between a first or forwardmost position 101 and a second or rearwardmost position 102. As should be understood, an amplitude compensator is mounted on opposite sides of the vibratory conveyor 10 although only one is shown in the drawings.

As earlier discussed, the amplitude compensator 120 which is mounted on frame 30 coacts with conveyor bed 80 to substantially impede the bed from traveling beyond the given path of travel 100. Still further, the amplitude compensator, including the second leaf springs 121 have a range of motion when deformed. It being understood that this range of motion is substantially parallel to the path of travel of the bed.

Therefore, a vibratory conveyor apparatus 10 for moving particulate matter 86 includes a frame 30; a drive assembly 40 borne by the frame 30 and operable to impart vibratory motion to the frame 30, the vibratory motion having a predetermined frequency. As noted earlier, a plurality of first leaf springs 60 are borne by the frame 30 and wherein the first leaf springs 60 are substantially parallel, one to another, and oriented at an oblique angle relative to the frame, and wherein each of the first leaf springs has a predetermined range of motion. A bed 80 is mounted on and supported by the first leaf springs 60 and wherein the vibratory motion imparted to the frame 30 is transmitted to the bed 80 by each of the first leaf springs 60 to cause the bed 80 to reciprocate relative to the frame. The bed 80 has a path of travel 100 which comprises a reciprocating displacement which is defined between a first position 101 and a second position 102. The movement of the bed 80 has an amplitude which varies in proportion to the frequency of the vibratory motion and to a mass density of the particulate matter 86 supported by the bed 80. An amplitude compensator 120 comprising a second leaf spring 121 mounted on the frame 30 and which coacts with the bed 80 to limit the amplitude of the movement of the bed along the path of travel is seen in FIG. 3. The amplitude compensator 120 and the second leaf spring 121 in particular, substantially impedes the first leaf springs 160 from traveling outside the predetermined range of motion 73. In the event that the bed 80 moves outside the given range of travel 100 the contact member 190 impinges against the second end 123 of the respective second leaf springs 121 thereby transmitting a force between the bed 80 and the frame 30 substantially impeding further movement of the bed beyond the given range of motion.

Therefore it will be seen that the vibratory conveyor apparatus 10 of the subject invention provides a convenient means whereby particulate matter 86 can be moved efficiently along a vibratory conveyor and which further avoids the detriments individually associated with utilizing a vibratory conveyor of more traditional design.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A vibratory conveyor apparatus, comprising:
   a frame;
   a drive assembly borne by the frame for imparting vibratory motion to the frame;
   a first resilient member comprised of a first leaf spring mounted on the frame;
   a bed mounted on the first resilient member, the first resilient member transmitting the vibratory motion from the frame to the bed and wherein the vibratory motion of the bed comprises a reciprocating movement along a given range of motion, and wherein the range of motion is defined between a first forwardmost position, and a second, rearwardmost position;
   an amplitude compensator comprising a second resilient member mounted on the frame to substantially impede the bed from traveling outside a given range of motion as the bed moves in response to the vibratory motion, by transmitting a given force between the bed and the frame; and wherein the second resilient member is comprised of a second leaf spring; and
   wherein the given force is produced when the bed deforms the second resilient member, and wherein the deformation occurs as the bed travels outside the given range of motion; and wherein movement of the bed beyond the given range of motion causes the bed to impinge against the second resilient member, thus deforming the second resilient member.

2. A vibratory conveyor as claimed in claim 1, wherein the amplitude compensator further comprises a cushion mounted on the bed, and which engages the second leaf spring.

3. A vibratory conveyor as claimed in claim 2, wherein the amplitude compensator further comprises a cushion mounted on the second leaf spring, and wherein the cushion mounted on the bed engages the cushion mounted on the second leaf spring.

4. A vibratory conveyor as claimed in claim 2 wherein a contact member is mounted on the bed, and the cushion mounted on the bed is borne by the contact member.

5. A vibratory conveyor apparatus for moving particulate matter, the apparatus comprising:
   a frame;
   a drive assembly borne by the frame and operable to impart vibratory motion to the frame, the vibratory motion having a predetermined frequency;
   a plurality of first leaf springs borne by the frame, and wherein the first leaf springs are substantially parallel, one to another, and oriented at an oblique angle relative to the frame, and wherein each of the first leaf springs has a predetermined range of motion;
   a bed mounted on and supported by the first leaf springs, and wherein the vibratory motion imparted to the frame is transmitted to the bed by each of the first leaf springs to cause the bed to reciprocate relative to the frame, and wherein the bed has a path of travel which comprises a reciprocating displacement which is defined between a first position and a second position, and wherein the movement of the bed has an amplitude which varies in proportion to the frequency of the vibratory motion and to a mass density of the particulate matter supported by the bed; and
   an amplitude compensator comprising a second leaf spring mounted on the frame and which acts on the bed to limit the amplitude of movement of the bed along the path of travel and substantially impede the first leaf springs from traveling outside the predetermined range of motion.

6. A vibratory conveyor as claimed in claim 5, wherein the second leaf spring has a first end and a second end, and wherein the first end is mounted on the frame and the second end extends toward the bed, and wherein the second leaf spring is substantially parallel to the first leaf springs and has a range of motion when deformed, and wherein the range of motion is substantially parallel to the path of travel of the bed.

7. A vibratory conveyor as claimed in claim 6, wherein movement of the bed beyond a given amplitude causes the amplitude compensator to transmit a given force between the bed and the frame, and wherein the given force is substantially parallel to the movement of the bed, and wherein the given force is substantially proportional to the amplitude of movement of the bed along the path of travel.

8. A vibratory conveyor as claimed in claim 7, wherein the amplitude compensator further comprises a contact member mounted on the bed and which impinges against the second end of the second leaf spring when the bed moves beyond the path of travel.

9. A vibratory conveyor as claimed in claim 8, wherein the second leaf spring comprises:
   a pair of second leaf springs which are disposed in predetermined parallel spaced relation one to the other, and wherein the contact member is oriented between the pair of second leaf springs, and wherein the contact member impinges alternately against each of the pair of second leaf springs when the bed moves beyond the path of travel.

10. A vibratory conveyor as claimed in claim 9, wherein the amplitude compensator further comprises a plurality of third leaf springs having substantially identical length dimensions and having a length dimension shorter than the second leaf springs, and wherein the third leaf springs are mounted on the second leaf springs and coact with the same.

11. A vibratory conveyor as claimed in claim 10, wherein the amplitude compensator further comprises a cushion mounted on the contact member.

12. A vibratory conveyor as claimed in claim 11, wherein the amplitude compensator further comprises a cushion mounted on each of the second leaf springs to engage the cushion mounted on the contact member.

13. A vibratory conveyor as claimed in claim 5, wherein the drive assembly includes a variable speed motor.

14. A vibratory conveyor apparatus for moving particulate matter, comprising:
   a frame;
   a drive assembly borne by the frame and operable to impart vibratory motion to the frame;
   a plurality of resilient members borne by the frame, each resilient member having a predetermined range of motion;
   a bed mounted on the resilient members, and wherein the vibratory motion imparted to the frame is transmitted to the bed by the resilient members to cause the bed to reciprocate along a given path of travel relative to the frame, and wherein the path of travel is defined between a forwardmost position, and a rearwardmost position, and wherein the reciprocating movement of the bed along the path of travel has a given amplitude;
   an amplitude compensator mounted on the frame which coacts with the bed and substantially impedes the bed from traveling beyond the given path of trave; and wherein the amplitude compensator comprises a spring having a first end and a second end, the first end being mounted on the frame, and wherein the second end has a range of motion when the spring is deformed, and wherein the range of motion is substantially parallel to the path of travel of the bed.

15. A vibratory conveyor as claimed in claim 14, a wherein the amplitude compensator substantially impedes the bed from moving beyond the forwardmost and rearwardmost positions by transmitting a given force between the bed and the frame, and wherein the given force is oriented in a direction which is substantially parallel to the path of travel of the bed, and wherein the given force is operable to substantially limit the movement of the bed to the given path of travel.

16. A vibratory conveyor as claimed in claim 15, wherein the amplitude compensator further comprises a contact member mounted on the bed and which impinges against the second end of the spring when the bed moves beyond the path of travel, and wherein the given force is produced when the contact member impinges against the spring and deforms the spring.

17. A vibratory conveyor as claimed in claim 16, wherein the spring comprises a pair of leaf springs which are disposed in predetermined parallel spaced relation one to the other, and wherein the contact member is oriented between the pair of leaf springs, and wherein the bed moving beyond the forwardmost position causes the contact member to impinge against one of the pair of leaf springs, and wherein the bed when moving beyond the rearwardmost position causes the contact member to impinge against the other of the pair of leaf springs.

18. A vibratory conveyor as claimed in claim 17, wherein the amplitude compensator further comprises a cushion mounted on the contact member.

19. A vibratory conveyor as claimed in claim 18, wherein the amplitude compensator further comprises a cushion mounted on each of the leaf springs and wherein the cushions mounted on the leaf springs contact the cushion mounted on the contact member.

20. A vibratory conveyor as claimed in claim 16, wherein the drive assembly includes a variable speed motor.

21. A vibratory conveyor apparatus, comprising:
   a frame;
   a drive assembly, including a variable speed motor borne by the frame for imparting vibratory motion to the frame;
   a first resilient member comprised of a first leaf spring mounted on the frame;
   a bed mounted on the first resilient member, the first resilient member transmitting the vibratory motion from the frame to the bed, and wherein the vibratory motion of the bed comprises a reciprocating movement along a given range of motion, and wherein the range of motion is defined between a first forwardmost position, and a second, rearwardmost position;
   an amplitude compensator comprising a second resilient member mounted on the frame to substantially impede the bed from traveling outside a given range of motion as the bed moves in response to the vibratory motion, by transmitting a given force between the bed and the frame; and wherein the second resilient member is comprised of a second leaf spring; and wherein the given force is produced when the bed deforms the second resilient member, and wherein the deformation occurs as the bed travels outside the given range of motion; and wherein movement of the bed beyond the given range of motion causes the bed to impinge against the second resilient member, thus deforming the second resilient member.

22. A vibratory conveyor apparatus for moving particulate matter, the apparatus comprising:
   a frame;
   a drive assembly borne by the frame and operable to impart vibratory motion to the frame;
   a plurality of springs borne by the frame;
   a bed supported by the springs;
   wherein vibratory motion imparted to the frame is transmitted to the bed by the springs to cause the bed to reciprocate relative to the frame, and wherein the bed reciprocates between first and second positions; and
   an amplitude compensator comprising a second spring mounted between the frame and bed and which is disposed to engage one of the bed and frame and deflect responsive to motion of the bed beyond the first and second positions to thereby limit motion of the bed beyond the first and second positions.

* * * * *